US007221379B2

United States Patent
Mullins et al.

(10) Patent No.: US 7,221,379 B2
(45) Date of Patent: May 22, 2007

(54) INTEGRATED OBJECT SQUASH AND STRETCH METHOD AND APPARATUS

(75) Inventors: David H. Mullins, Kensington, CA (US); Steven Clay Hunter, San Francisco, CA (US); Robert H. Russ, Richmond, CA (US); William A. Wise, Oakland, CA (US); William F. Sheffler, Oakland, CA (US); Christian D. Hoffman, Oakland, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 10/766,515

(22) Filed: Jan. 27, 2004

(65) Prior Publication Data
US 2005/0007370 A1 Jan. 13, 2005

Related U.S. Application Data

(60) Provisional application No. 60/470,931, filed on May 14, 2003.

(51) Int. Cl.
*G09G 5/00* (2006.01)
*G06T 15/70* (2006.01)

(52) U.S. Cl. .................. 345/648; 345/664; 345/473
(58) Field of Classification Search ............ 345/619, 345/664, 666, 665, 684, 473; 715/850, 852
See application file for complete search history.

(56) References Cited

U.S. PATENT DOCUMENTS 5,731,819 A * 3/1998 Gagne et al. ............. 345/647

| | | |
|---|---|---|
| 6,448,964 B1 | 9/2002 | Isaacs et al. |
| 6,539,927 B2 | 9/2002 | Horowitz et al. |
| 6,593,927 B2 * | 7/2003 | Horowitz et al. ......... 345/473 |
| 2004/0085311 A1 * | 5/2004 | Lee et al. .................. 345/419 |

OTHER PUBLICATIONS

Weiley, John and Bay, Byron. "3d in movies: How it works", Jan. 7, 2001, www.helio.com.au/features/how3dworks.html.*
Chenney et al., "Stimulating Cartoon Style Animation," Proceedings of the 2nd International Symposium on Non-Photorealistic Animation and Rendering Session, 2002, pp. 133-138.

* cited by examiner

*Primary Examiner*—Kee M. Tung
*Assistant Examiner*—Michelle K. Lay
(74) *Attorney, Agent, or Firm*—Townsend and Townsend and Crew LLP

(57) ABSTRACT

A graphical user interface for a computer system includes a display portion configured to display a representation of a first three-dimensional object and a second three-dimensional object, wherein the first three-dimensional object has an associated first volume, and wherein the second three-dimensional object has an associated second volume, and a control icon associated with the first three-dimensional object, wherein a user can specify a modification to the first three-dimensional object in a first dimension via the control icon, wherein the display portion is also configured to display a representation of a modified first three-dimensional object, wherein the modified first three-dimensional object comprises the first three-dimensional object that is modified in the first dimension in response to the modification and that is modified in a second dimension in response to the modification and to a volume preservation value.

21 Claims, 10 Drawing Sheets

ARM AT REST WITH THE SQUASH AND STRETCH WIDGET DISPLAYED. TO MOVE THE ARM, THE ANIMATOR GRABS THE CUBE MANIPULATOR AND DRAGS IT EITHER IN THE POSITIVE OR NEGATIVE DIRECTION TO DEFORM THE ARM

ARM DEFORMED WITH SQUASH AND STRETCH WIDGET IN THE NEGATIVE DIRECTION. NOTICE THAT THERE IS VOLUME PRESERVATION ACROSS THE UPPER ARM AND FOREARM.

ARM DEFORMED WITH SQUASH AND STRETCH WIDGET IN THE POSITIVE DIRECTION. NOTICE THE SMOOTH TRANSITION BETWEEN THE UPPER ARM AND LOWER ARM.

ARM IN REST POSITION

ARM DEFORMED
NEGATIVELY USING
SIX INDIVIDUAL SCALE
CONTROLS. NOTE
THAT USING THE
SINGLE CONTROLS
CAUSES LOSS OF
VOLUME IN THE ARM
AT THE ELBOW.

ARM DEFORMED
POSITIVELY USING SIX
INDIVIDUAL SCALE
CONTROLS. NOTE
THAT USING THE
SINGLE CONTROLS
CAUSE LOSS OF
VOLUME IN THE ARM,
UNDESIRED BULGING
AT THE ELBOW.

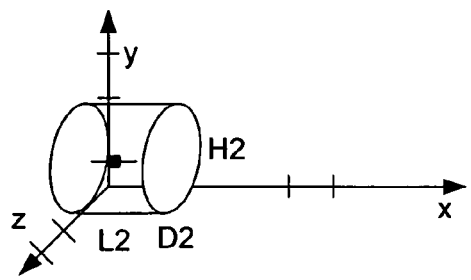
FIG. 5C
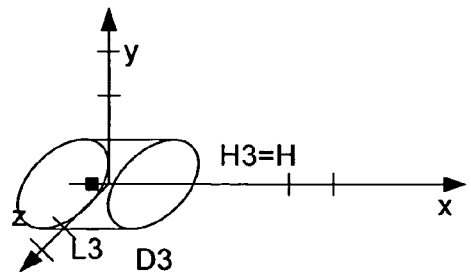
FIG. 5D
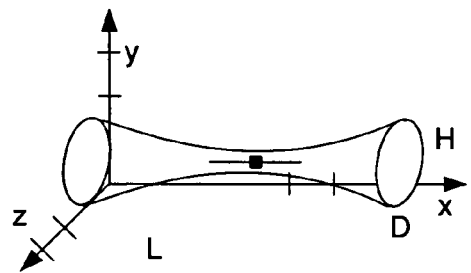
FIG. 5E
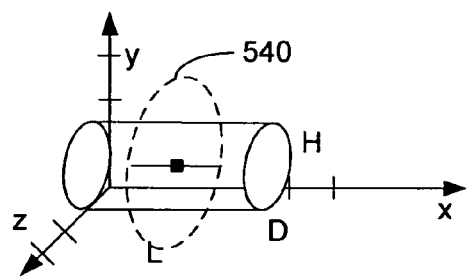
FIG. 5F
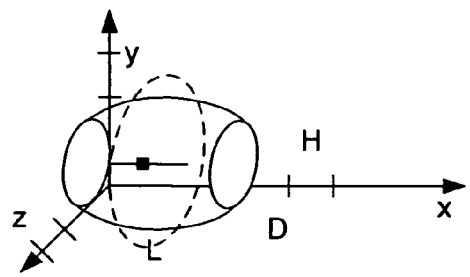
FIG. 5G1

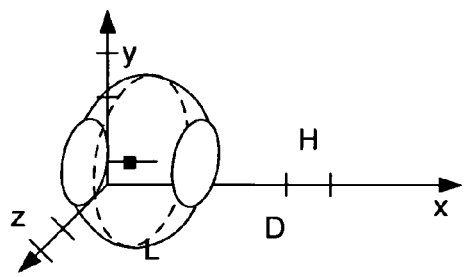
FIG. 5G2
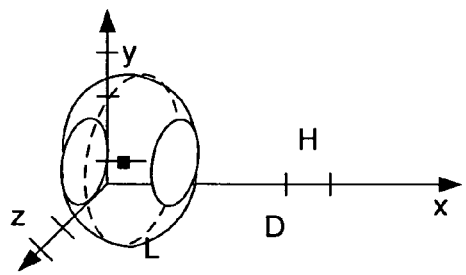
FIG. 5G3
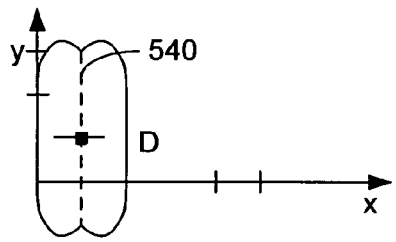
FIG. 5G4
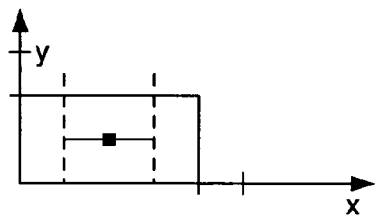
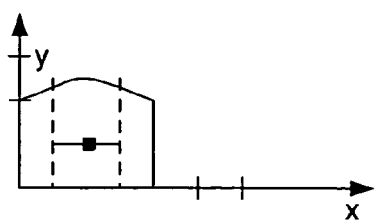
FIG. 5H

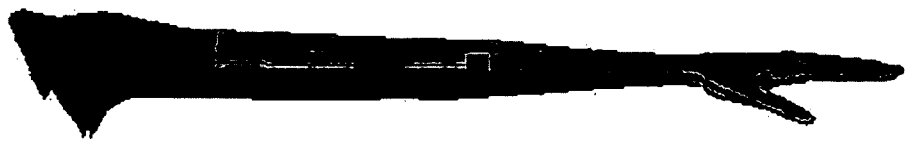

ARM AT REST WITH THE SQUASH AND STRETCH
WIDGET DISPLAYED. TO MOVE THE ARM, THE
ANIMATOR GRABS THE CUBE MANIPULATOR AND
DRAGS IT EITHER IN THE POSITIVE OR NEGATIVE
DIRECTION TO DEFORM THE ARM

FIG. 7A

ARM DEFORMED WITH
SQUASH AND
STRETCH WIDGET IN
THE NEGATIVE
DIRECTION. NOTICE
THAT THERE IS
VOLUME
PRESERVATION
ACROSS THE UPPER
ARM AND FOREARM.

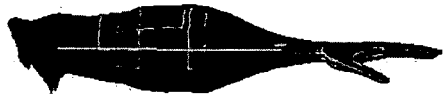

FIG. 7B

ARM DEFORMED WITH
SQUASH AND
STRETCH WIDGET IN
THE POSITIVE
DIRECTION. NOTICE
THE SMOOTH
TRANSITION BETWEEN
THE UPPER ARM AND
LOWER ARM.

FIG. 7C

INTEGRATED OBJECT SQUASH AND STRETCH METHOD AND APPARATUS

CROSS-REFERENCES TO RELATED APPLICATIONS

The present invention is related to and incorporates by reference for all purposes provisional application No. 60/470931 filed May 14, 2003.

BACKGROUND OF THE INVENTION

The present invention relates to computer animation. More specifically, the present invention relates to object manipulation, and in particular object squash and stretch methods and apparatus.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and physical animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Physical-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Physical animation techniques were developed by movie makers such as Willie O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment physical animation techniques. For example, physical models could be represented by virtual models in computer memory, and manipulated.

One of the pioneering companies in the computer aided animation (CA) industry was Pixar. Pixar developed both computing platforms specially designed for computer animation and animation software now known as RenderMan®. RenderMan® was particularly well received in the animation industry and recognized with two Academy Awards®. While RenderMan® was focused upon rendering, the creation of images from geometric models, the animation software developed for in-house use focused upon allowing animators to specify ("animate") the geometric models. The geometric models typically represent objects in a scene, characters in a scene, positions of objects and characters, manipulation of objects and characters, lighting, textures, and the like.

Techniques for object manipulation known in the industry as "squash and stretch," was first described by Walt Disney animators in the 1930s. These techniques were attempts to allow animators to deform an object in motion to attempt to mimic "natural" changes of an object as it progressed "through an action." Attempting to maintain the volume of an object while in motion enables animators to convey the pliable nature of the object.

In the field of 3D animation, presently available animation tools have been better suited to working with solid objects like cars and teapots as they produces rigid looking volumes in motion. Typically, squash and stretch techniques were not needed for solid or rigid objects.

Prior to the present invention, animators would have access to separate and very specific controls that could be individually operated on to deform an object. For example, animating an arm, in the forearm you would have three separate "scale" controls to change the shape: length, width and thickness. The animators would also have the same controls in the forearm. The animator would then have to control the relationships between those six controls to try and achieve the function of the squashing and stretching. For example, to stretch the arm, some of the controls would be set in the positive direction, some of the controls would be set in the negative direction and the animator would be responsible for sorting out which direction each control should be set. Unfortunately, the six controls treat the arm as two separate pieces and the resulting shape is highly undesirable.

FIGS. 1A–C illustrate inferior results of manual prior art techniques. More specifically, FIG. 1A illustrates an example of an arm having an upper portion, and a lower portion in a rest position. FIG. 1B illustrates the arm that has been squashed using non-integrated object squash and stretch operations, such as scale. As can be seen in FIG. 1B, one problem with traditional techniques is that the elbow volume is not properly maintained. FIG. 1C illustrates the arm that has been stretched using non-integrated object squash and stretch operations, such as scale. As can be seen in FIG. 1C, one problem with traditional techniques is that the elbow volume is improperly maintained.

Recently third party 3D animation packages like Alias/Wavefront's Maya have begun to support a customization of their controls that allows animators to write custom command code to "blend shapes." The inventors have considered that in light of the present disclosure, theoretically, using commercially available packages, they might be able to take an object and compensate for squash and stretch, however not without a lot of labor for preparing an object model, and writing custom code.

The inventors of the present invention have determined that methods for automated and integrated squashing and stretching of objects is needed in the context of 3D animation, without the drawbacks illustrated above.

SUMMARY OF THE INVENTION

The present invention relates to object manipulation. More specifically, the present invention relates to an integrated object squash and stretch method and apparatus. The present invention disclosure describes features from a Pixar brand squash and stretch software technique known as "Squetch."

Embodiments of the integrated squash and stretch invention is a mechanical animation control that combines one, two, or more separate object volume preservation functions into a single operation in a computer-based animation program. The control is accessed by selecting a predefined mode and interacting with a graphical widget (e.g. icon) that provides direct manipulation of the shape of an object. The amount of volume preservation is an animatable control that increases or decreases. Pixar brand volume preservation amount is called "squamount."

In this embodiment, squamount is approximately the percentage of volume that is persevered, such that 0 is no volume preservation, or a scale while 1 is complete preservation.

The squash and stretch methods described herein are desired when working with fleshy objects such as humans. As an example, consider the change in the shape of a bicep when an arm bends. When the arm is contracted, the bicep bulges to reveal its mass, as opposed to when the arm is extended, the bicep elongates and conforms to the bone. However, the inventors have discovered that squash and stretch techniques are also useful for "rigid" items, such as staplers, cars, lamps, and the like.

These techniques are used frequently throughout an entire character to soften the hard mechanical feeling of motion traditionally present in 3D animation. Accordingly, squash and stretch controls can be found on a character's face, jaw, head, neck, chest, torso, body, arm, hand fingers, leg, foot, toe, etc. In addition to bringing a sense of flexibility to an organic object, integrated squash and stretch with volume preservation allows the animators to produce an effect to heighten emotion or to bring attention to something.

According to one aspect of the invention, a method of object manipulation in a computer system is described. One technique includes displaying a first three-dimensional object and a second three-dimensional object on a display, wherein the first three-dimensional object and the second three-dimensional object together have an associated first volume, and displaying a control indicator on the display, wherein the control indicator is associated with both the first three-dimensional object and with the second three-dimensional object. The process may also include receiving an offset for the control indicator in response to user input with a user input device, and automatically scaling the first three-dimensional object and the second three-dimensional object in a first dimension by a first amount in response to the offset, and automatically scaling the first three-dimensional object and the second three-dimensional object in a second dimension by a second amount in response to the offset and a volume preservation factor to form a modified first three-dimensional object and a modified second three-dimensional object, wherein the modified first three-dimensional object and the modified second three-dimensional object together have an associated second volume. The second volume is determined in response to the volume preservation factor for the first three-dimensional object and the second three-dimensional object.

According to another aspect of the invention, a computer program product for a computer system including a processor and a display is disclosed. The computer executable code includes code that directs the processor to display a representation of a first object and a representation of a second object on the display, wherein the first object has an associated first volume, and the second object has an associated second volume, code that directs the processor to determine a volume preservation factor, and code that directs the processor to associate the first object and the second object. Additional executable code includes code that directs the processor to receive an indication of a first modification value for the first object and the second object in a first dimension, code that directs the processor to modify a size of the first object and a size of the second object in the first dimension in response to the first modification value, and code that directs the processor to determine a second modification value for the first object and the second object in a second dimension in response to the first modification value, and to the volume preservation factor. Software may also include code that directs the processor to modify a size of the first object and a size of the second object in the second dimension in response to the second modification value, and code that directs the processor to display a representation of the first object after modification and the second object after modification on the display. In various embodiments, the first object after modification is associated with a first modified volume, and the first modified volume is determined in response to the volume preservation factor. The computer executable code resides on a tangible media such as a hard drive, network drive, CD-ROM, or the like.

According to yet another aspect of the invention, a graphical user interface for a computer system is disclosed. A GUI may include a display portion configured to display a representation of a first three-dimensional object and a second three-dimensional object, wherein the first three-dimensional object has an associated first volume, and wherein the second three-dimensional object has an associated second volume, and a control icon associated with the first three-dimensional object, wherein a user can specify a modification to the first three-dimensional object in a first dimension via the control icon. The GUI may also have a display portion configured to display a representation of a modified first three-dimensional object, wherein the modified first three-dimensional object comprises the first three-dimensional object that is modified in the first dimension in response to the modification and that is modified in a second dimension in response to the modification and to a volume preservation value.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 4A–G illustrate a typical squash and stretch process;

FIGS. 5A–5H illustrate additional embodiments of the present invention;

FIGS. 7A–C illustrate examples of the present invention.

DETAILED DESCRIPTION OF THE INVENTION

Figure 2:
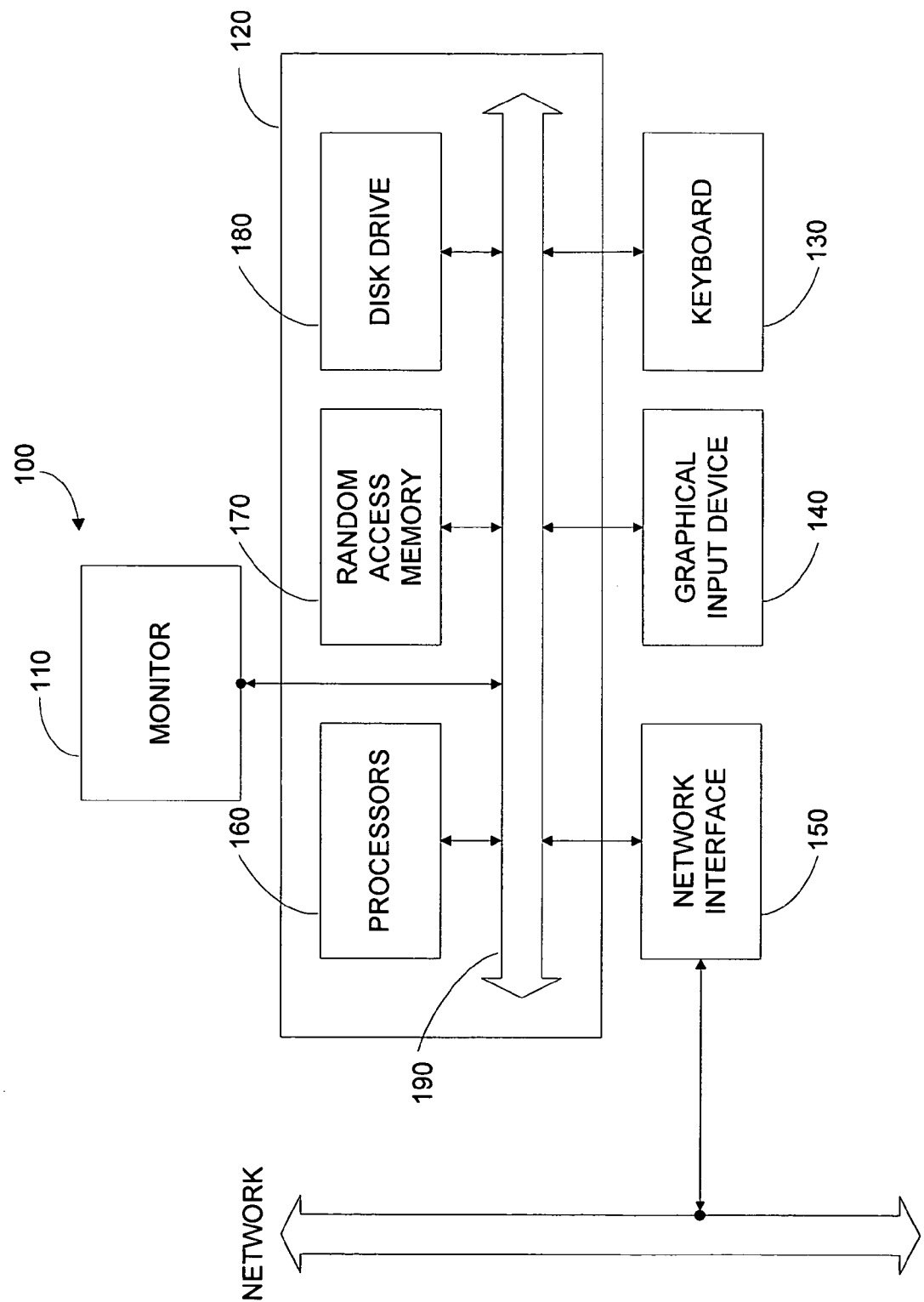
FIG. 2 illustrates a block diagram of an animation system according to one embodiment of the present invention.

FIG. 2 is a block diagram of typical computer rendering system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having one or more microprocessors from Intel Corporation. Further, in the present embodiment, computer 120 may include a UNIX-based operating system such as Linux.

RAM 170 and disk drive 180 are examples of tangible media for storage of data, audio/video files, computer programs, applet interpreters or compilers, virtual machines, embodiments of the herein described invention including an animation engine, geometric description of objects, characters, object data files, character rigging, shader descriptors, a rendering engine, output image files, texture maps, displacement maps, scattering lengths and absorption data of object materials, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 2 is representative of computer animation systems capable of embodying the present invention. It will be readily apparent to one of ordinary skill in the art that many other hardware and software configurations are suitable for use with the present invention. For example, the use of other micro processors are contemplated, such as Pentium™, Xeon™, or Itanium™ microprocessors; Opteron™ or AthlonXP™ microprocessors from Advanced Micro Devices, Inc; PowerPC G3™, G4™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 3A:
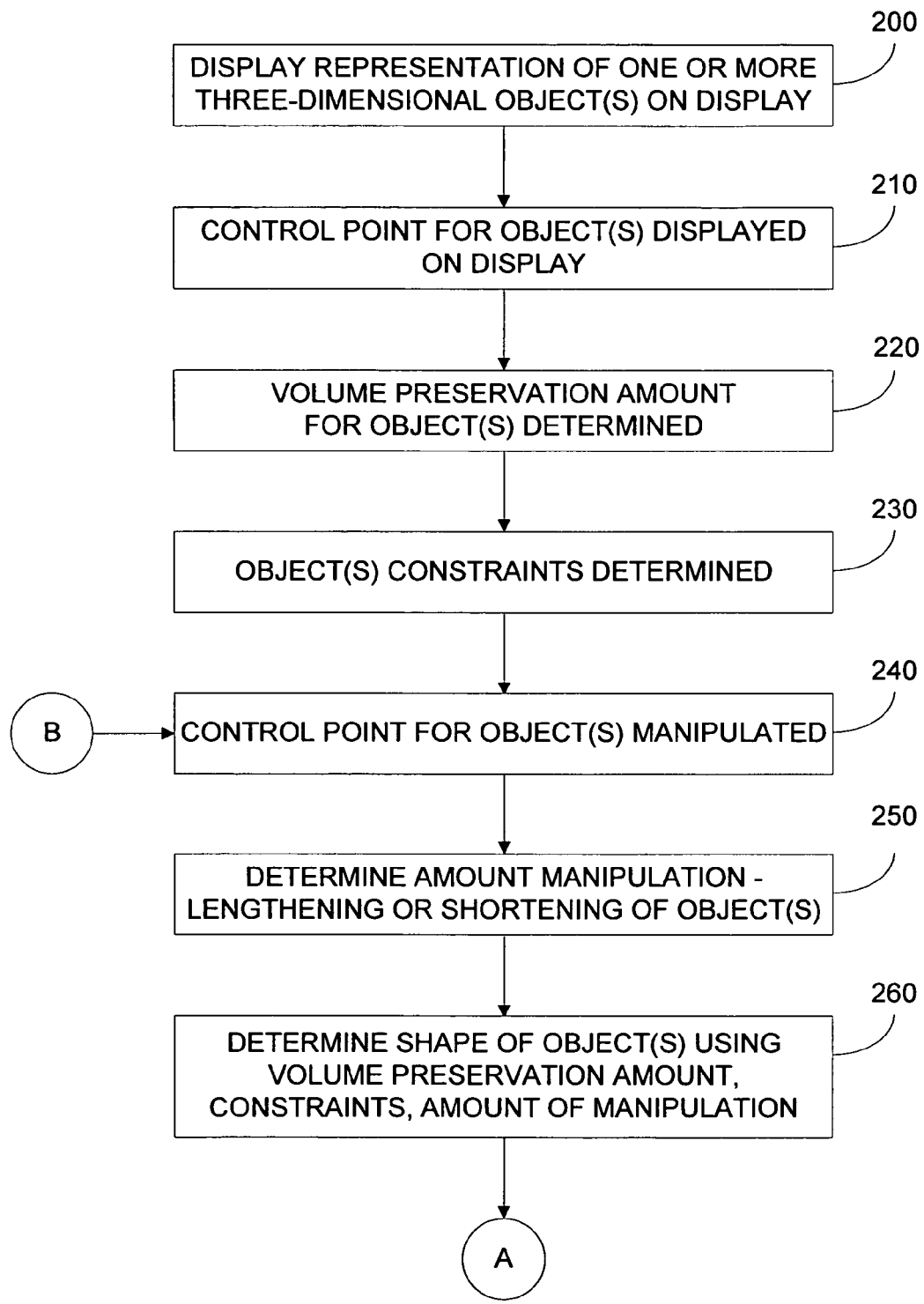
FIGS. 3A–B illustrates a block diagram of a process flow according to an embodiment of the present invention.
Figure 3B:
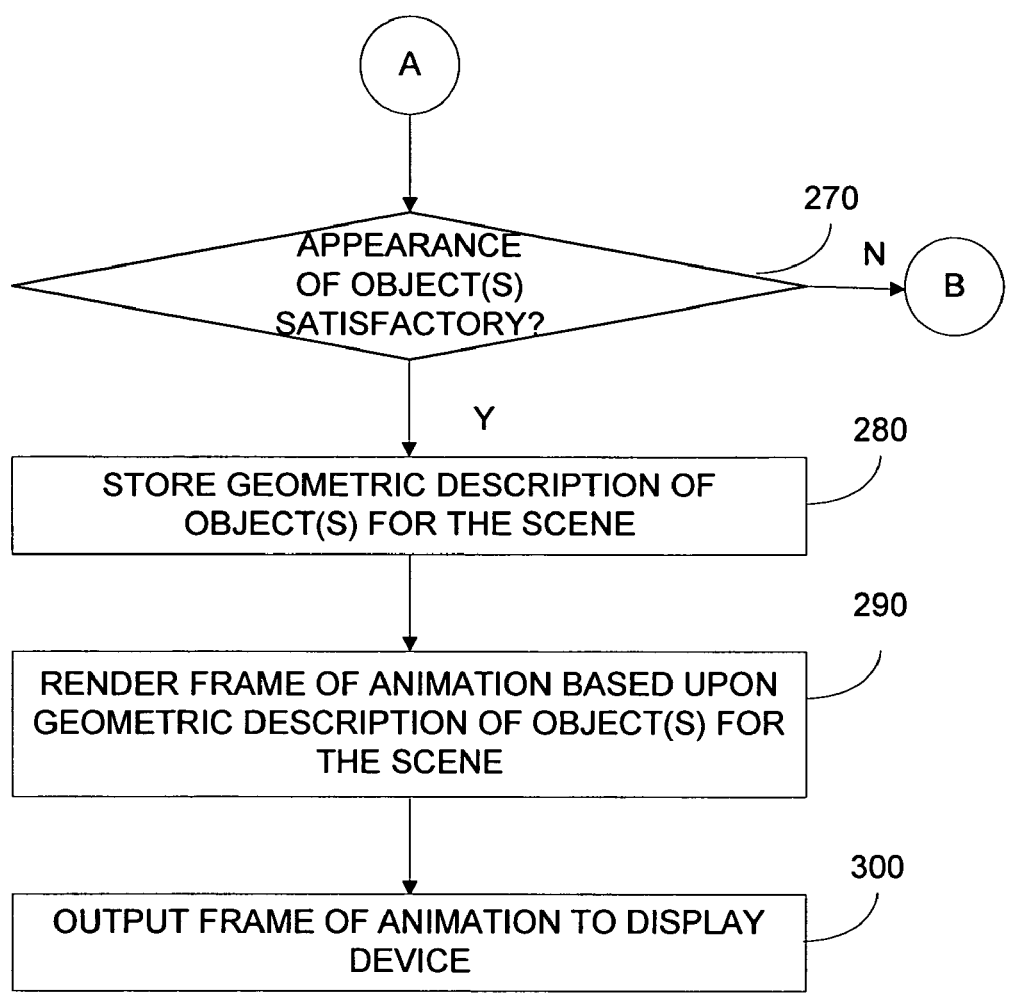

FIGS. 3A–C illustrates a block diagram of a process flow according to an embodiment of the present invention.

In the embodiment illustrated, initially a representation of one or more three-dimensional objects are displayed on a display and selected by the user, step 200. This may resemble a CAD-like, view of the geometric objects. Next, typically in response to a user selection, a control point associated with the objects are also displayed on the display, step 210. In embodiments of the present invention, the selection may be the user clicking directly on the objects on the display, may be in response to a user hitting a "hot key" on a keyboard, to a user selecting one or more icons or menu selections on the display, may be performed by the selection of one or more keys on a keyboard (e.g. picking objects automatically while traversing a defined model hierarchy via arrow keys, "pickwalking"), in any other conventional manner, or the like. This invokes the integrated squash and stretch command to be available for the group of selected objects.

In this embodiment, the user may input an amount of volume preservation desired for this process, step 220. In the present embodiment, the amount ranges from 0 (no volume preservation) to 1 (full volume preservation), however, in other embodiments, the amount may be negative, or represented by any other range of numbers, for example 0 to 100, or the like. Any conventional method for allowing a user to select the amount from the amount range can be used, for example, graphical slider, direct keyboard input, hot key input, graphical numeric pad, and the like. In other embodiments, the amount of volume preservation may be defined or pre-defined by another user, thus this step may be skipped. The Pixar brand term for an amount of volume preservation is known as "squamount".

In the process illustrated in FIG. 3A, constraints for the objects may be specified, step 230. Many different constraints on the objects can be specified, and some will be illustrated below. For example, objects may have a maximum size in the x, y, or z dimension; the objects may have cross-sections that have a maximum area, the objects may have portions that have different rates of expansion or contraction; the objects may have different volume preservation amount, and the like.

In the present embodiment, the user then selects and moves the control point on the display, step 240. In one embodiment, the control point is typically constrained to move in only one of the primary coordinate axis of the objects. For example, in an x, y, z coordinate system, the control point may be constrained to move in the +x and −x directions, +y and −y directions, etc; in a cylindrical coordinate system of the objects, the control point may be constrained to move in the +r and −r directions or the +z and −z directions. Maximum, and/or minimum constraints may be specified to limit the range of positions of movement of the control point.

In other embodiments of the present invention, the control point may move in more than one of the primary coordinate axes. For example, in an x, y, z coordinate system of an object, the control point can be moved within the x-y plane, the control point can be moved within the x-z plane, or the like.

In the present embodiments, an amount of shortening, or an amount of lengthening of the objects is determined in response to the movement of the control point, step 250. In other words, how much objects are squashed or stretched is determined, respectively. In systems where the movement of the control point is constrained to a single object coordinate axis, the squash or stretch of the object can be easily determined. In systems where the movement of the control point is constrained to move in the objects coordinate plane, the squash or stretch of the objects in the separate dimensions can be determined using standard trigonometric calculations, or the like. In other embodiments, the user can specify the amount by direct keyboard entry, or the amount can be specified as dependent upon the size of the "opening" for the objects.

In the present example, dimensions for the objects and the final shape of the objects are then determined, step 260. In the various examples, the final shape is determined based upon the squash or stretch amount of the objects, the amount of volume preservation specified, the constraints specified, and the like. As will be illustrated below, a great number of constraints may be defined that are used in determining the final shape of the objects after being squashed or stretched.

The process repeats, until the user/animator, is satisfied with the squashed or stretched shape of the objects, step 270. The shape data (geometric data) of the objects, orientation of the objects, etc. are typically stored for that frame of animation, step 280. Later, the geometric data is retrieved during a rendering process, and the objects are rendered and recorded within that frame, step 290. Subsequently, the frame of animation can be output for viewing by the user/animator, by an audience, or the like, on a display such as a television, computer, theater screen, etc., step 300. Additionally, the frame of animation may be recorded onto a tangible media such as movie film, paper, plastic, metal, or the like, may be recorded in a appropriate representation onto an optical, magnetic media, solid state media, or the like. Additionally, the frame of animation may be transmitted across one or more computer networks in the appropriate encoding format.

FIGS. 4A–G illustrate embodiments of the present invention. More specifically, FIGS. 4A–G illustrate a typical squash and stretch process.

Figure 4A:
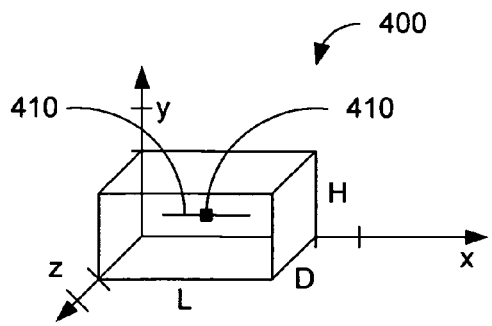
FIGS. 4A–G illustrate embodiments of the present invention. More specifically.

FIG. 4A illustrates a typical display of simple object 400 having a length dimension L in the x direction, a height H in the y direction, and a depth D in the z direction. Also illustrated in FIG. 4A is a typical control icon/point 410, and a line 420.

In the present embodiment, line 420 is used to visually indicate to a user, the direction of stretch or squash allowed. As illustrated in this example, control point 410 is constrained to be moved in the x direction.

Figure 4B:
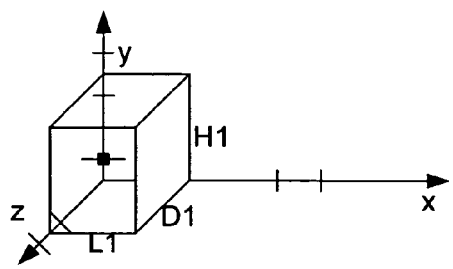

In the example in FIG. 4B, the volume preservation is set to 1. In this example, the user has selected the control point 410 and dragged it to the left, indicating that the length L of object 400 is to be shortened to length L1. In response, the computer system attempts to preserve the volume of object 400 and determines a larger depth D1 and a larger height H1 for object 400. In this case, where the volume preservation is set to one, the following relationship will approximately hold: $L*D*H = L1*D1*H1$.

Figure 4C:
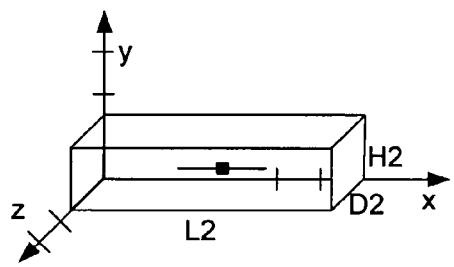
Figure 4D:
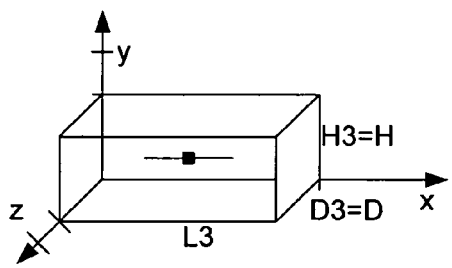

In the example in FIG. 4C, the volume preservation is again set to 1. In this example, the user has selected the control point 410 and dragged it to the right, indicating that the length L of object 400 is to be stretched to length L2. In response, the computer system attempts to preserve the volume of object 400 and determines a smaller depth D2 and smaller height H2 for object 400. In the present embodiment, the following equation can be used for determining the dimensions of the object:

$$L'*D'*H' = ((L-L')*Vp + L')*D*H$$

In this equation, L', D' and H' are the length, depth, and height of the squashed or stretched object(s), L, D and H are the length, depth, and height of the beginning object(s), and VP is the target or set volume preservation amount (e.g. 0 to 1).

In this case, where the volume preservation is set to one, the following relationship will approximately hold: $L2*D2*H2 = L*D*H$ In the example in FIG. 4D, the volume preservation is set to 0. In this example, the user has selected the control point 410 and dragged it to the right, indicating that the length L of object 400 is to be stretched to length L3. In response, the computer system does not attempt to preserve the volume of object 400 and thus, the height H3 remains H and the depth D3 remains D for object 400. Accordingly the volume is $L'*D3*H3 = L'*D*H$.

Figure 4E:
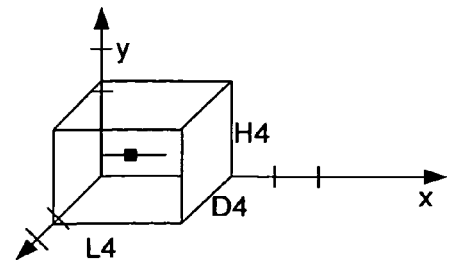

In the example in FIG. 4E, the volume preservation is set to 0.5. In this example, the user has selected the control point 410 and dragged it to the left, indicating that the length L of object 400 is to be shortened to length L4. In response, the computer system attempts to preserve some the volume of object 400 and thus, the height becomes H4 and the depth becomes D4 for object 400. Using the equation, above, where the volume preservation is set to 0.5, the following relationship will approximately hold: $L4*D4*H4 = (L+L4)*D*H*0.5$.

Figure 4F:
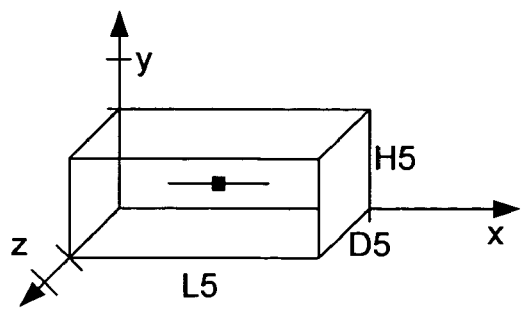

In the example in FIG. 4F, in other embodiments, the volume preservation may be set to a negative number. In this example, the user has selected the control point 410 and dragged it to the right, indicating that the length L of object 400 is to be changed to length L5. In this example the volume preservation is set to −1. In response, the computer system increases the volume and thus, the height becomes H5 and the depth becomes D5 for object 400. In this case, $L5*D5*H5 = (2*L5 - L)*D*H$. As can be seen, when L5 is greater than L, the volume is greater than $L*D*H$, and when L5 is less than L, the volume is less than $L*D*H$.

In light of the present disclosure, one of ordinary skill in the art would understand that the volume preservation may be set to other values (e.g.>1), and the effects upon the volume can be readily determined. Further, in the above embodiments, the length of the object was increased or decreased, however, it should be understood that in other embodiments, the depth D, or height H could be directly manipulated instead of the length, or in addition to the length. Additionally, the simultaneous manipulation of combinations of depth and height, length and depth, height and length are also contemplated in other embodiments of the present invention. For example, as discussed above, moving the control point within a plane, not simply a line.

Figure 4G:
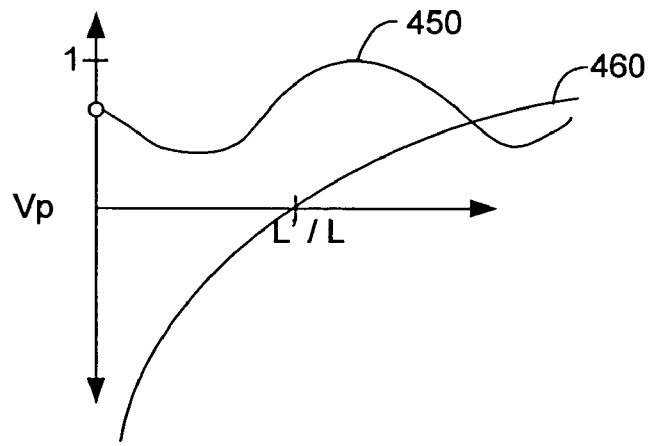

FIG. 4G illustrates relationships of various embodiment of the present invention. In embodiments of the present invention, the volume preservation Vp need not be constant, and may vary based upon the amount of change of the desired dimension. As is illustrated in FIG. 4G, any number of relationships can be used such as relationship 450, 460 and the like. The relationships may be based upon equation or manual selection. One effect that may be achieved by varying the volume preservation Vp is that as an object is stretched or squashed, the effect is "eased in" and "eased out" at the pre-determined limits to the squash or stretch.

In embodiments of the present invention, when one dimension of the object is lengthened or shortened, the remaining two dimensions of the object are shortened and/or lengthened. As discussed above, the remaining two dimensions of the object are adjusted to attempt to preserve volume, depending upon the volume preservation factor. In embodiments of the present invention, the system may use a "scale" command in the remaining two dimensions to increase or decrease the remaining two dimensions. Additionally, a "scale" command may also be used to increase or decrease the adjusted dimensions. For example, if the length of the object is increased to twice the length, the system may first perform a scale command on the object in the length dimension of 200%. Next, based upon full volume preservation, the system may determine that the cross-section of the object in the remaining two dimensions should also be halved. To do this, the system may perform a scale command on the object in the depth and height dimensions. In this example, the scale command would be approximately ~71% (0.707=(1/(2 exp 0.5))). This scale function may be applied to any of the embodiments contemplated.

Figure 5A:
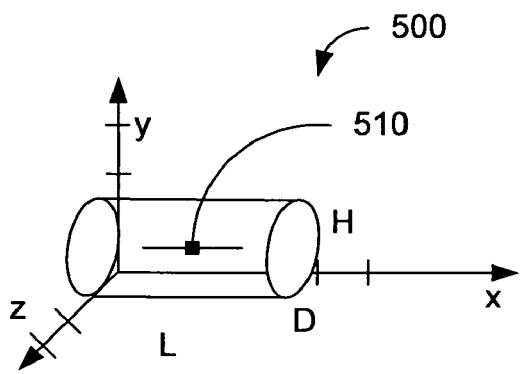

FIGS. 5A–5G4 illustrate additional embodiments of the present invention. In particular, FIG. 5A illustrates a cylinder 500 (a non rectilinear object) having a length L, height H, and depth D. A control point 510 is illustrated on cylinder 500. The embodiments illustrate the use of geometric constraints during squash and stretch operations.

Figure 5B:
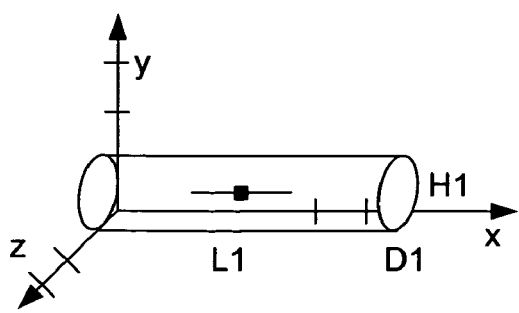

In the example in FIG. 5B, control point 510 is selected by the user and the length is increased. In this example, using a volume preservation factor from >0 to 1, as cylinder 500 is stretched to L1, the depth D1 and the height H1 decreases.

In the example in FIG. 5C, the user shortens the length of cylinder 500. Using the same parameters above, as can be seen cylinder 500 is shortened to L2, the depth D2 and height H2 increases.

In the example in FIG. 5D, the rates of change of cylinder 500 in the component directions can be different. Starting with the example in FIG. 5A, the user lengthens cylinder 500 to length L3. In this example, the height H is constrained to be constant or have a smaller rate of change compared to the depth D. Based upon the volume preservation factor, the height changes to H3 and the depth changes to D3. In this example, D3 is configured to increase or decrease faster than H3 in response to the shortening or lengthening of the length of the cylinder. For example, for L3>L, D3/D<H3/H; and for L3<L, D3/D>H3/H. In embodiments of the present invention, the rates of change may be constant or may change based upon a variety of factors, such as the length L3 compared to L, constraints to D, L, H, etc., or the like.

In the example in FIG. 5E, end portions 520 and 530 are constrained to be constant. In various embodiments, end portions 520 and 530 may be portions of cylinder 500 that are adjacent to other geometric objects. Because, the other geometric objects may not be subject to squash or stretch, the end portions should remain the same size.

Figure 1A:
FIGS. 1A–C results of manual prior art techniques.
Figure 1B:
Figure 1C:

As illustrated in this embodiment, when cylinder 500 is stretched, and end portions 520 and 530 are constrained, the shape of cylinder 500 will bend inwards. Furthermore, when cylinder 500 is squashed, with the same constraints, as illustrated in FIGS. 5G1–5G3, the shape of cylinder 500 may bend outwards. In embodiments of the present invention, the shape of the surface may be specified, the curvature of the surface may be determined, or the like, using mathematical equation, by manual plot, by scale command, or the like. What is typically aesthetically pleasing is when the shape of cylinder 500 has a gradual change in curvature.

In the example in FIG. 5F, end portions 520 and 530 are constrained, and a constraint 540 is specified. In this embodiment, constraint 540 may represent the maximum desired size of cylinder 500 through the squash and stretch operations.

FIGS. 5G1–5G4 illustrate a sequence of figures where cylinder 500 is squashed. In FIG. 5G1, constraint 540 has not yet been met; in FIG. 5G2, the size of cylinder 500 reaches constraint 540; and in FIGS. 5G3 and 5G4, cylinder 500 is squashed further than in FIG. 5G2. In the embodiment illustrated in FIG. 5G3, as can be seen, further squashing cylinder 500, does not result in cylinder 500 exceeding constraint 540.

In the embodiment illustrated in FIG. 5G4, in cross-section, by further squashing cylinder 500, constraint 540 is met, but only where constraint 540 is located, and other portions of cylinder 500 "bulge out" further. In one embodiment, constraint 540 is cross-section or "cylinder" constraint.

In other embodiments of the present invention, more than one set of cross-section constraints may be set for an object. For example, cylinder 500 may have 10 or more constraints. As illustrated in FIG. 5H, constraints may be used to shape the "bulge out" profile of cylinder 500. In additional embodiments, the constraints may specify a maximum shape for a "bulge out" and/or a minimum shape for a "bulge in."

As illustrated in the embodiments herein, to preserve volume, volume calculations can be performed on the object. In the examples in FIG. 4, the volume equation is simple to calculate, however, in the examples in FIG. 5, the volume equations are much more complex. In light of the present patent disclosure, one of ordinary skill in the art will be able to determine the volumes illustrated herein based upon fundamental mathematical principles, such as volume integrals, or the like. As an object is lengthened or shortened, volume calculations, and determination of the shape and size of the object at different locations can be performed on the fly. In other embodiments, these values may be predetermined, to increase perceived user performance and responsiveness.

In some embodiments of the present invention, it is not necessary to have mathematically correct volume preservation. Instead, simple assumptions can be used to simplify the volume calculations. One possible simplification is with the use of bounding boxes around an object. For example, in the example in FIG. 5A, instead of determining the volume of cylinder 500 to be $L*\pi*r*r$, one can assume the volume calculation is $L*D*H$. This simplification would work well when using the "scale" function for the different dimensions, as discussed above. In still other embodiments, volume preservation is not mathematically calculated, but is estimated by viewing the effect of the squash or stretch operation upon the object.

Figure 6A:
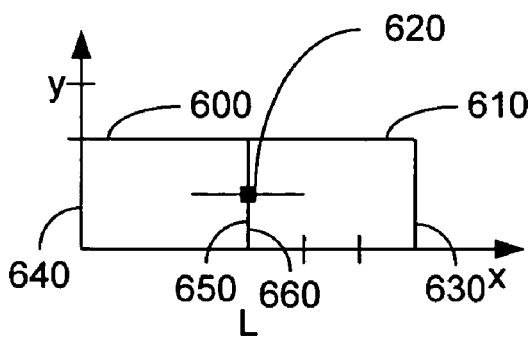
FIGS. 6A–6E illustrate additional embodiments of the present invention.

FIGS. 6A–6E illustrate additional embodiments of the present invention. In particular, FIG. 6A illustrates a first object 600 and second object 610, together having length L, height H, and depth D. A control point 620 is illustrated associated with both first object 600 and second object 610. The embodiments below illustrate squash and stretch operations based upon at least two objects. In such embodiments, a size constraint is set for end portions 630 and 640. Additionally, a constraint is for end portion 650 and end portion 660. A typical constraint is for the sizes and shapes of end portion 650 and end portion 660 to be equal.

Figure 6B:
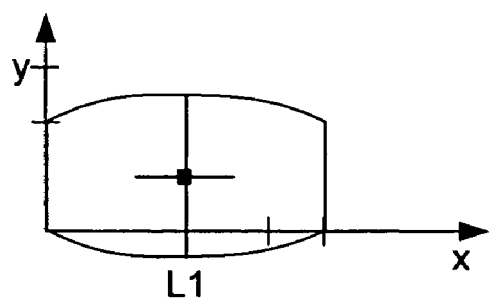
Figure 6C:
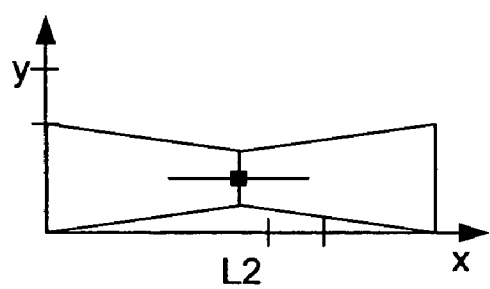

In the example in FIG. 6B, control point 620 is selected by the user for both objects 600 and 610 and the length of the combination is decreased. As can be seen, end portions 630 and 640 are constrained to be the same size, while the volume of both objects 600 and 610 are preserved. A similar result can be seen in the example in FIG. 6C, where the length of the combination is increased. As can be seen, end portions 630 and 640 are constrained to be the same size, while the volume of both objects 600 and 610 are preserved.

Figure 6D:
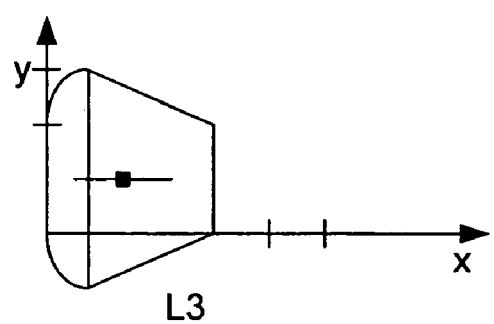
Figure 6E:
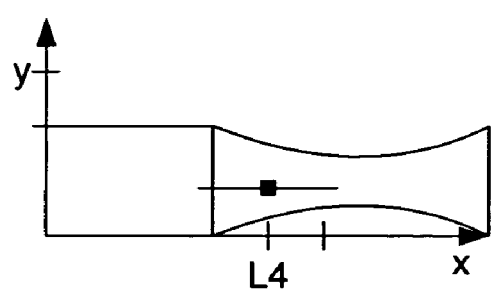

The examples in FIGS. 6D–6E, illustrate that the amount of lengthening or shortening of first object 600 relative to second object 610 can vary. For example, in response to a lengthen command, first object 600 may lengthened a smaller amount compared to second object 610 (FIG. 6E), and in response to a shorten command, first object 600 may be shortened by a greater amount compared to second object 610 (FIG. 6D). In the example in FIG. 6B, the system squashes first object 600 and second object 610 by an equal amount. However, as can be seen in FIG. 6D, the system can also squash first object 600 a greater amount than second object 610. Further, in the example in FIG. 6C, the system stretches first object 600 and second object 610 by an equal amount. However, as can be seen in FIG. 6E, the system can also stretch first object 610 a greater amount than second object 600. In these embodiments, the animator or other user may set-up parameters of these objects to stretch or squash at different relative rates.

In other embodiments of the present invention, any number of objects can be selected for a squash or stretch operation. For example, a single object, such as an eyeball can be squashed or stretched; and multiple objects, such as a complete character can be squashed or stretched. In light of the present disclosure, any number of constraints can be applied to different objects or different portions of an object. Further, the amount of volume preservation may be the same for all objects, for some of the objects, or different for all the objects. Still further, the shape of the objects after squash or stretch can also be constrained. Additionally, for different objects, the amount of squash or stretch relative to other objects may vary. For example, for a character face, when the head is compressed, the character's eyes may bulge out.

In additional embodiments of the present invention, the control point may be located at any location on the object or set of objects, such as the middle, top, bottom, end point, or the like. As illustrated in some of the embodiments, the effect of movement of the control point may translate to a non-symmetric volume preservation effect on the object. As an example, the control point may be located at one-third the length of an object, then as the control point is moved and the object is squashed, the one-third portion of the object is squashed more than the remaining two-thirds portion of the object. When the object is stretched in length, the one-third portion of the object may stretch less than the two-thirds portion of the object. The difference in squash or stretch may be an absolute difference, a percentage difference, or the like.

In various embodiments of the present invention, a user may define where the control point is on the object(s). The placement of the control on the object(s) at different locations may provide the user with the non-symmetric squash and stretch effects, described above in some embodiments. Additionally, in various embodiments, the control point may be moved in any of the three coordinate directions, such as x, y, and z. For example, for a oval cylinder, if the control point is moved parallel to the z-axis of the cylinder, the cylinder lengthens or shortens, and depending upon the squamount, the x and y size of the oval cylinder may be squashed and/or stretched. As another example, if the control point is moved in the x direction, the y size may move sympathetically, and/or the z length of the oval cylinder may also vary.

In other embodiments of the present invention, movement of the control point may translate to a simultaneous stretch and squash in the same direction. For example, a control point may be located at one-third the length of an object, then as the control point is moved in one direction, one-third of an object may squash, and two-thirds of an object may stretch, and when the control point is moved in the complementary direction, one-third of the object may stretch while the two-thirds portion of the object may be squashed. As described in the various embodiments above, volume preservation factors may be used to determine how the object(s) squash and stretch.

Embodiments of the present invention provide an integrated squash and stretch command for an animator that preserves volume. With these embodiments, animators have a specialized mode built into the character rig. This specialized squash and stretch mode may be included into a list of controls that are delivered as standard with the character model.

In the present embodiment, once the integrated squash and stretch controls is in the character rig, animators can simply engage the squash and stretch mode by picking on an object part and switching from select mode to squash and stretch mode. This results in a graphical representation, a widget to be displayed in a camera on the object part as illustrated in FIG. 7A. The widget has a single control that is drawn as small box attached to a line originating from the point from which the squash and stretch will be manipulated. At this point the animator may elongate the widget by dragging the box, thus stretching the object. Conversely, by compressing the widget, the object is squashed. The widget may also be moved by arrow keys, or other keyboard input.

In the present embodiment, the integrated squash and stretch mode mimics volume preservation on a cube, such that when the cube is lengthen in one direction, the other two dimensions compensate to preserve volume for the entire object. As discussed above, the rate of change of the other two dimensions need not be equal.

In the present embodiment, referring to the arm example again, squash and stretch on the limb is really a combination of two squash and stretch controls, one on the upper arm and one on the lower arm. Each control is comprised of a translate control down the limb to lengthen or contract the limb, and two scales, one that controls the width and one that controls the depth. These two scales are used in the volume preservation. When squamount is set to 1, each of those controls fire to try and preserve volume to the default setting. When squamount is set to 0, these compensating scales have no effect at all and result in strictly a lengthening or contracting of the arm. For squamount values between 0 and 1, you get a blending between full volume preservation and no volume preservation.

Results of embodiments of the present invention are illustrated in FIGS. 7B and 7C. In particular, FIG. 7B illustrates a squash with preserved elbow volume, and FIG. 7C illustrates a stretch without elbow bulging.

In other embodiments of the present invention, the translate control in the primary direction can be replaced with a scale control. This has been extremely useful when rigging a character's head because it is simpler to install. In the foregoing specification, the invention has been described with reference to specific exemplary embodiments thereof.

Many changes or modifications are readily envisioned. In light of the above disclosure, one of ordinary skill in the art would recognize that any number of combinations of constraints, rates of change, volume preservation amounts, and even ways for approximating volume calculations can be used in embodiments of the present invention. For example, the rates of change of an object in component directions can be the same or different, the relative rates of change of objects being squashed or stretch may be the same or different. In some embodiments, limits to a stretch or squash can be introduced. Further, limits as to an increase or decrease in dimension for other dimensions may also be used. The volume of objects can be mathematically correct or approximated using bounding boxes, or combinations of the above.

In actual use, the objects being squashed or stretch may be a single three-dimensional object such as an eyeball, finger, nose, or the like, or groups of three-dimensional objects, such as objects making-up a head, a torso, feet, hands, wheels, or the like. Further, the teachings may also be applied in the area of two-dimensional objects. Accordingly, one would recognize that the integrated squash and control functionality described is extremely powerful.

The objects that are modified according to the above software tools can subsequently be rendered using any conventional rendering package, such as RenderMan®, or the like. Further, the rendered images may be recorded onto a physical media such as optical media (e.g. DVD, CD-ROM), film, magnetic media (e.g. hard disk, video tape), or the like. A user may view the rendered images with a computer monitor, television, projection device, or other device.

In embodiments of the present invention, the squash and stretch calculations and modifications to objects are implemented by the animation system. By comparison, in the prior art, animators would have to manually "eye-ball" and adjust the object to squash or stretch the object. Because the present system provides sophisticated an automated and integrated squash and stretch functionality, the inventors believe that the squash and stretch of objects performed by this system are much more consistent from frame to frame. Further, the inventors believe that the squash and stretch of objects performed by this system provide a more accurate representation of real-world physics. Accordingly, the inventors believe that frames of animation including objects squashed and stretched by the present system will be noticeably more realistic that was previously obtainable.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention. For example, the volume preservation amount may not be specified by the animator/user but by another user such as a "rigger," or "articulator."

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of object manipulation in a computer system comprises:
   displaying a first three-dimensional object on a display, wherein the first three-dimensional object comprises a second three-dimensional object and a third three-dimensional object, wherein the first three-dimensional object has an associated first volume;
   displaying a control indicator on the display, wherein the control indicator is associated with the first three-dimensional object;
   receiving an offset in a first dimension for the control indicator in response to user input with a user input device;
   forming a modified first three-dimensional object having an associated second volume in response to the offset comprising:
      automatically scaling the first three-dimensional object in a first dimension by a first amount in response to the offset of the control indicator; and
      automatically modifying a cross-section of the first three-dimensional object perpendicular to the first dimension in at least a second dimension in response to the offset of the control indicator, in response to the associated first volume, and in response to a constraint;
   wherein the associated second volume is determined in response to the associated first volume; and
   wherein the constraint comprises having a size and a shape of a first end of the first three-dimensional object being equal to a size and a shape of a first end of the modified first three-dimensional object.

2. The method of claim 1 wherein a shape profile of the third three-dimensional object is different from the shape profile of the modified third three-dimensional object.

3. The method of claim 1 wherein the associated first volume is substantially similar to the associated second volume.

4. The method of claim 1 wherein the second volume is less than the first volume.

5. The method of claim 1 wherein automatically scaling the first three-dimensional object in the first dimension comprises increasing a size of the first three-dimensional object in the first dimension.

6. The method of claim 5 wherein
   automatically modifying the first three-dimensional object in at least the second dimension comprises automatically decreasing the size of a cross-section of the first three-dimensional object in a plane perpendicular to the first dimension, in at least the second dimension.

7. The method of claim 1
   wherein automatically scaling the first three-dimensional object in the first dimension comprises decreasing a size of the first three-dimensional object in the first dimension; and
   automatically modifying the first three-dimensional object in at least the second dimension comprises automatically increasing the size of a cross-section of the first three-dimensional object in a plane perpendicular to the first dimension, in the second dimension and a third dimension.

8. The method of claim 7 farther comprising:
   rendering the modified third three-dimensional object to form a rendered object; and
   storing a representation of the rendered object into a memory.

9. A computer-readable medium including the representation of the rendered object determined in claim 8.

10. A computer program product stored on a computer-readable medium including executable instructions for a computer system including a processor and a display includes:
    code that directs the processor to display a representation of a first object and a representation of a second object on the display, wherein the first object has an associated first volume, and the second object has an associated second volume, wherein a third object on the display comprises the first object and the second object and has an associated third volume;
    code that directs the processor to determine a volume preservation factor associated with the third object;
    code that directs the processor to determine a constraint associated with the third object, wherein the constraint is not associated with the first object or second object;
    code that directs the processor to receive an indication of a first modification value for the third object in a first dimension;

code that directs the processor to modify a size of the first object and a size of the second object in the first dimension in response to the first modification value for the third object;

code that directs the processor to determine a second modification value for the first object and the second object in a second dimension in response to the first modification value for the third object, to the constraint associated with the third object and to the volume preservation factor associated with the third object;

code that directs the processor to modify a size of the first object and a size of the second object in the second dimension in response to the second modification value; and code that directs the processor to display a representation of the first object after modification and the second object after modification on the display;

wherein the first object after modification is associated with a first modified volume;

wherein the first modified volume is determined in response to the volume preservation factor.

11. The computer program product of claim 10
wherein the second object after modification is associated with a second modified volume;
wherein the first volume is approximately equal to the first modified volume; and
wherein the second volume is approximately equal to the second modified volume.

12. The computer program product of claim 11 wherein the volume preservation factor indicates full volume preservation.

13. The computer program product of claim 10
wherein the volume preservation factor indicates less than full volume preservation; and
wherein the first modified volume is less than the first volume.

14. The computer program product of claim 10
wherein code that directs the processor to modify the size of the first object and the size of the second object in the first dimension comprises code that directs the processor to increase the size of the first object and the size of the second object in the first dimension in response to the first modification value; and
wherein code that directs the processor to modify the size of the first object and the size of the second object in the second dimension comprises code that directs the processor to decrease the size of the first object and the size of the second object in the second dimension in response to the second modification value.

15. The computer program product of claim 10
wherein code that directs the processor to modify the size of the first object and the size of the second object in the first dimension comprises code that directs the processor to decrease the size of the first object and the size of the second object in the first dimension in response to the first modification value; and
wherein code that directs the processor to modify the size of the first object and the size of the second object in the second dimension comprises code that directs the processor to increase the size of the first object and the size of the second object in the second dimension in response to the second modification value.

16. The computer program product of claim 15 wherein code that directs the processor to receive an indication of a the first modification value for the third object in a first dimension comprises code that directs the processor to receive an indication of the first modification value for the third object in a first dimension from a user input device selected from the group consisting of: keyboard, graphical input device, voice input.

17. A graphical user interface for a computer system includes:

a display portion configured to display a representation of a third three-dimensional object comprising a first three-dimensional object and a second three-dimensional object, wherein the first three-dimensional object has an associated first volume, wherein the second three-dimensional object has an associated second volume, and wherein the third three-dimensional object has an associated third volume;

a control icon associated with the third three-dimensional object, wherein a user can specify a modification to the third three-dimensional object in a first dimension via the control icon; and wherein the display portion is also configured to display a representation of a modified third three-dimensional object, wherein the modified third three-dimensional object comprises the third three-dimensional object that is modified in the first dimension in response to the modification and that is modified in a second dimension in response to the modification, a constraint associated with the third three-dimensional object, and to a volume preservation value, wherein the constraints are not associated with the first three-dimensional object.

18. The graphical user interface of claim 17 further comprising a display portion configured to display a currently selected volume preservation value.

19. The graphical user interface of claim 17
wherein the constraint are not associated with the second three-dimensional object; and
wherein the constraint is selected from a group consisting of: profile constraint, and dimension constraint.

20. The graphical user interface of claim 19
wherein the modification to the third three-dimensional object in the first dimension comprises a modification selected from the group consisting of: lengthening, shortening; and
wherein the modification to the third three-dimensional object is in the second dimension comprises a modification respectively selected from the group consisting of: shortening, lengthening.

21. The graphical user interface of claim 19 wherein the modified third three-dimensional object comprises the third three-dimensional object that is modified in the first dimension in response to the modification, that is modified in a second dimension in response to the modification, to the volume preservation value and to the constraint.

* * * * *